May 22, 1956   E. I. VALYI   2,746,104
APPARATUS FOR PRODUCING SHELL MOLDS
Filed Oct. 24, 1952   3 Sheets-Sheet 1
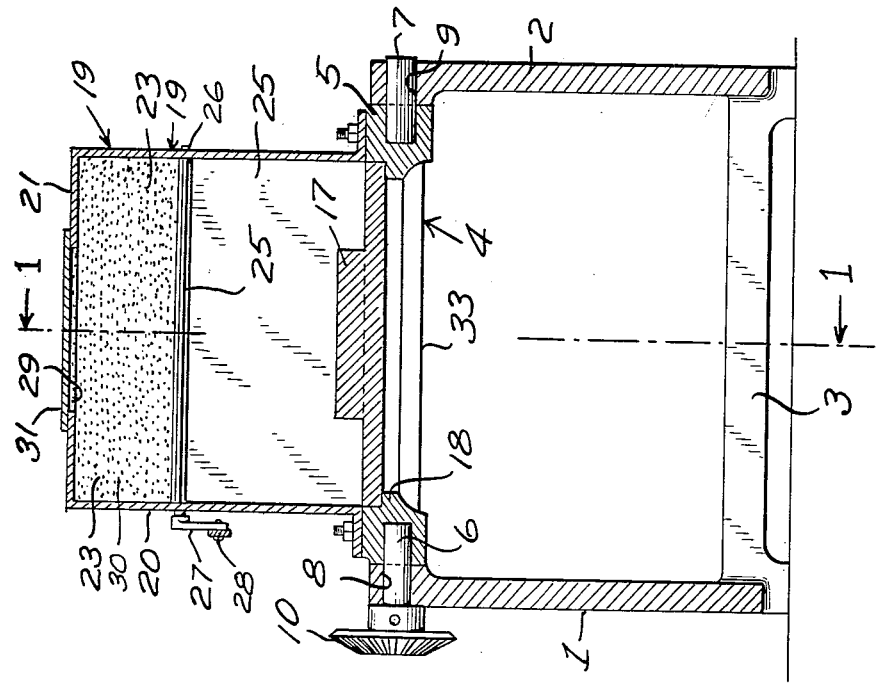
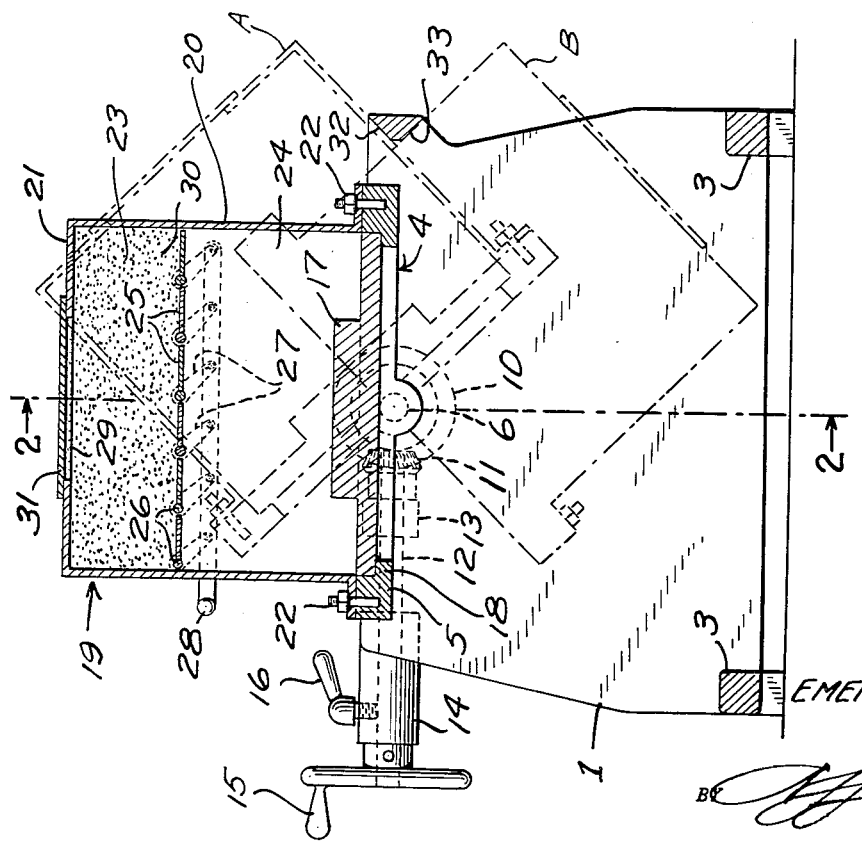
INVENTOR.
EMERY I. VALYI
ATTORNEY

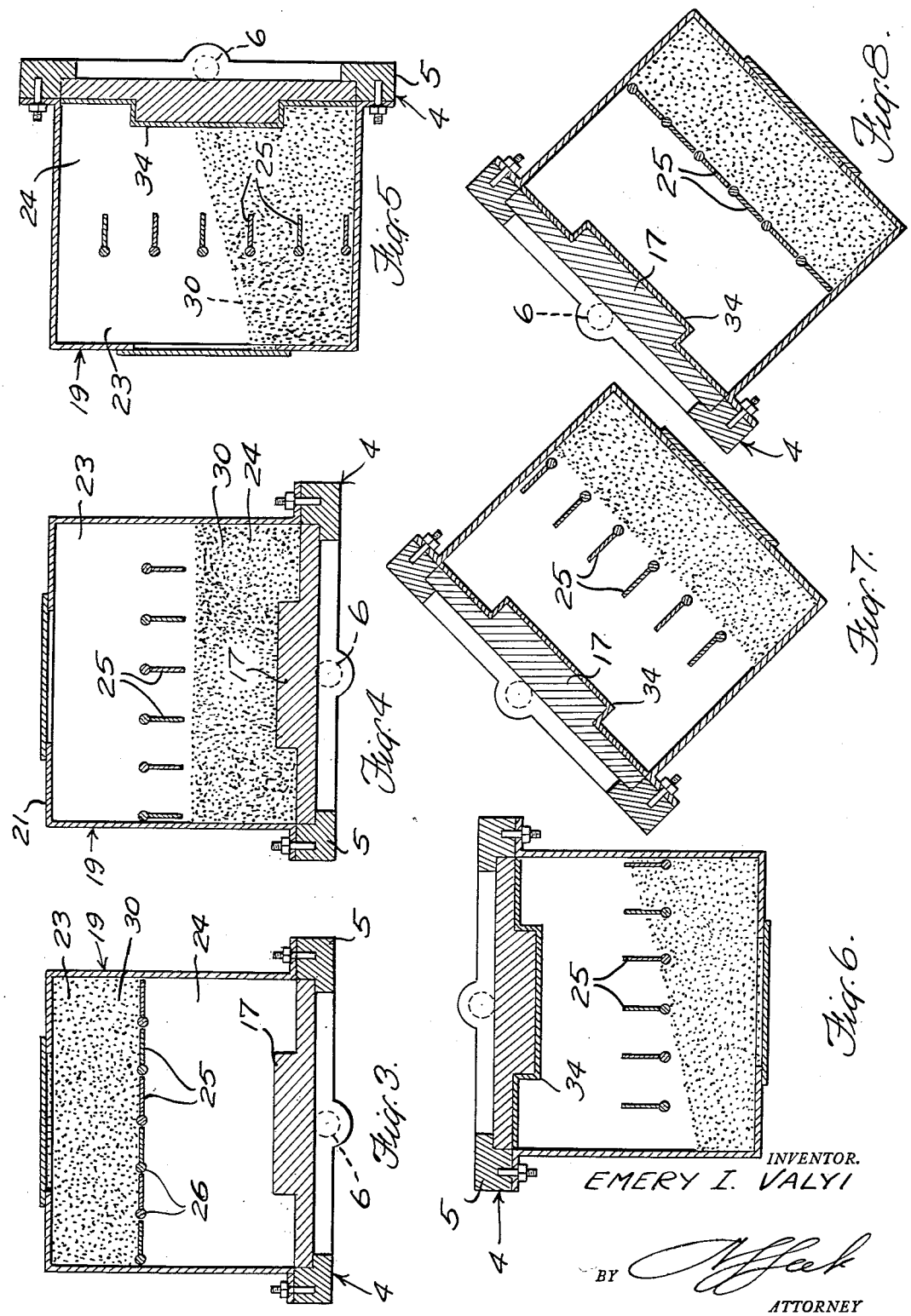

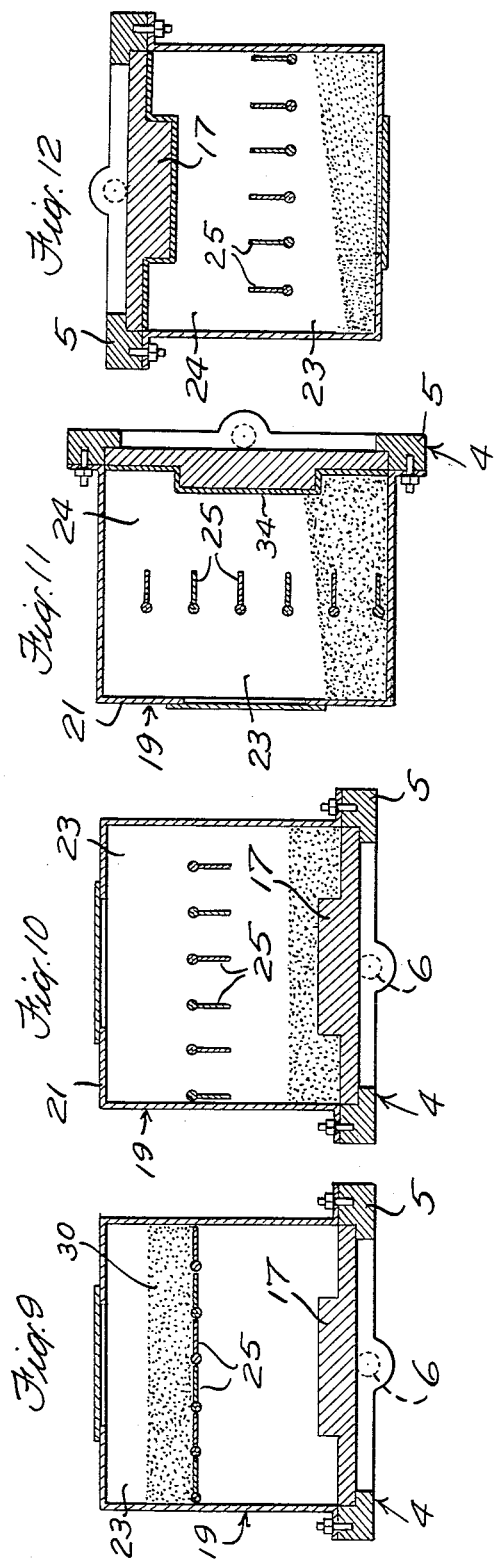
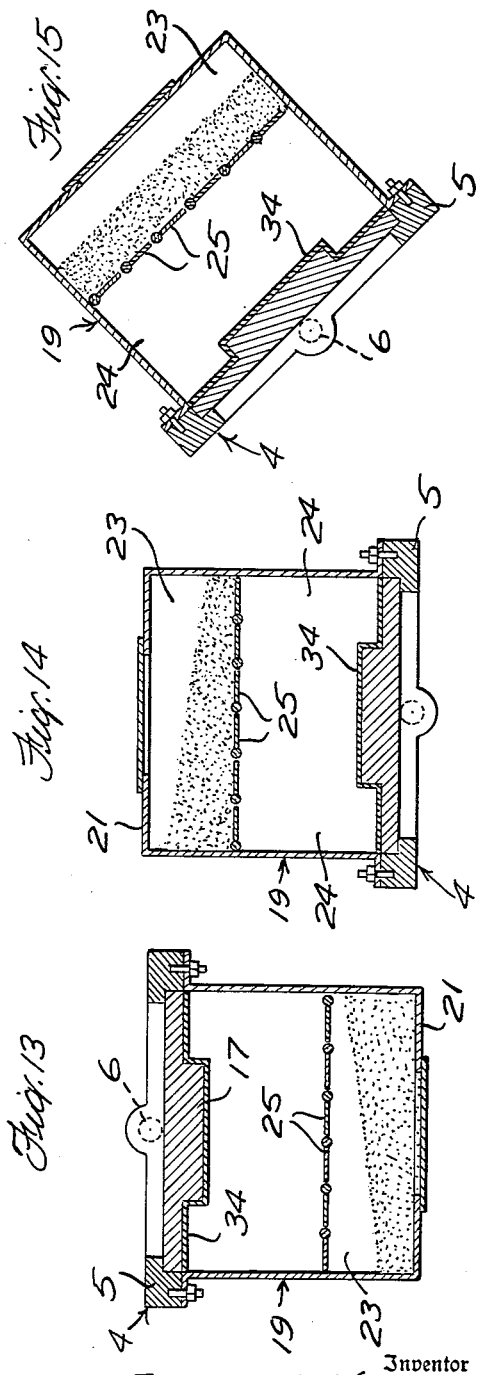

United States Patent Office 2,746,104
Patented May 22, 1956

2,746,104
APPARATUS FOR PRODUCING SHELL MOLDS

Emery I. Valyi, New York, N. Y.

Application October 24, 1952, Serial No. 316,626

2 Claims. (Cl. 22—9)

This invention relates to a process and apparatus for producing foundry molds in shell form from a granular molding mixture comprising a refractory and a bonding agent, and is a modification of the Mold Forming Machine disclosed in my Patents No. 2,659,944 and 2,659,945.

Machines of this type provide means for processing a permanent pattern in a plurality of steps for pretreating the pattern, forming the mold shell thereon, curing the shell and stripping the cured shell from the pattern.

More specifically the machines include a pattern holder, mounted to rotate about a horizontal axis for inverting and restoring the holder as required, and a hopper carrying the molding mixture. Means are provided for securing the pattern holder and hopper in juxtaposition for applying a layer of the molding mixture to the pattern, inverting the pattern holder and hopper as a unit to dump the excess mixture back into the hopper after the mold shell has been formed, for curing the shell, and for stripping the cured shell from the pattern.

In the embodiment illustrated herein the said hopper is shown as comprising a rectangular casing which is open at the lower end thereof and is adapted to be removably secured to the pattern holder around the periphery of a preheated pattern thereon. A set of louvers are mounted in the hopper between the upper and lower ends thereof and divide the hopper into two compartments. The louvers are opened and closed by suitable mechanism.

In operation the granular molding mixture is placed in the upper compartment above the louvers in the hopper. The hopper is then removably secured to the top of the pattern holder around the periphery of a pattern thereon. The louvers are then opened to allow the molding mixture to drop down into the lower compartment upon the preheated pattern. After the mixture has bonded into a thin layer over the pattern, the pattern holder and hopper are inverted by rotating them in unison. As the holder and hopper are inverted the unbonded molding mixture falls back into the upper compartment (now the bottom compartment), leaving the thin bonded shell on the pattern. The louvers are then closed and the hopper and holder are restored to upright position, after which the hopper is removed from the pattern carrier. The shell formed on the pattern is then cured into a hard, rigid, strong condition by suitable mechanism (not shown), after which the cured shell is removed from the pattern. The pattern is then again heated to the desired temperature and the operation repeated for each mold shell.

When using metal patterns the refractory-bonding agent mixture may comprise silica, alumina or zirconia sands or flours for the refractory, and phenol-melamine or urea formaldehyde resins or other organic or inorganic bonding agents. With this mixture the pattern may be preheated to a temperature of from 350° F. to 600° F. The pattern may be contacted with the molding mixture to a depth of several inches for from five to twenty seconds during which time the heated pattern causes the mixture contacting the pattern to bond and solidify into a layer. A partly cured shell having a uniform thickness between one-eighth and one-quarter inch is then formed over the pattern. The thickness of the shell depends on the time of contact and the temperature of the pattern.

In order to produce a shell mold of uniform thickness and density from a molding mixture, such as described, it is essential that the molding mixture be evenly distributed over the heated pattern while it is in contact therewith. The depth of the molding mixture over the pattern is an important factor in producing satisfactory shell molds. If this depth varies over different sections of the pattern the resultant shell mold will vary accordingly.

As the holder and hopper are moved back and forth between upright and inverted positions the upper surface of the molding mixture in the hopper, if less than the volumetric content of the upper compartment of the hopper, will be disposed at an angle to the supporting means therefor in both upright and inverted positions. When in upright position the molding mixture is supported above the pattern on the louvers which divide the hopper into upper and lower compartments, and are in closed position when the hopper is returned from inverted to upright position. In inverted position of the hopper the molding mixture rests on the closed end of the hopper. When the holder and hopper are in upright position with the molding mixture in the upper compartment of the hopper it is essential that the upper surface of the molding mixture be substantially parallel to the supporting louvers in order to provide a uniform depth to the molding mixture throughout the contained body thereof. Otherwise when the louvers are opened to drop the molding mixture onto the pattern the molding mixture will be deposited unevenly over the pattern which will result in a poor mold shell.

When the hopper is returned from inverted to upright position the depth of the molding mixture at the trailing end of the hopper is considerably greater than the depth thereof at the forward end of the hopper. Means are therefore provided to redistribute the molding mixture to a uniform depth as the hopper is brought to rest in vertical upright position. This means comprises rotating the holder and hopper from inverted position on past the initial vertical upright position to an inclined position, against a suitable limiting stop, which causes the granulated molding mixture to flow toward the leading end of the hopper and redistribute to a substantially uniform depth in the upper compartment upon the louvers. The holder and hopper are then returned to the initial vertical upright position.

When the upper compartment of the hopper is always maintained practically full of the molding mixture, the depth of the molding mixture will of necessity be substantially uniform throughout the upper compartment when the holder and hopper are in initial upright position. But after the holder and hopper have been inverted, with the louvers open, to drop the unbonded molding mixture from the pattern back into the upper compartment, the returned molding mixture is so unevenly distributed that a portion thereof remains in the lower compartment and interferes with and prevents closing of the louvers preparatory to returning the holder and hopper to upright position. Means are therefore provided by which all of the unbonded molding mixture is returned to the upper compartment and is distributed to a substantially uniform depth thereon when the holder and hopper are rotated from upright to inverted position. This means comprises rotating the holder and hopper from upright position on past vertical inverted position to an inclined position against a suitable limiting stop which causes the granulated molding mixture to flow toward the trailing end of the hopper and redistributes to a substantially uniform depth in the upper compartment under the louvers. The louvers are then closed after which the holder and hopper are returned to initial vertical upright position.

The principal object of the invention is to provide an improved process and apparatus for producing shell molds from a molding mixture of the character described.

Other and more limited objects of the invention will be apparent from the following specification and the accompanying drawings forming a part thereof wherein:

Fig. 1 is a central vertical longitudinal section through a machine for producing shell molds according to my new process, the plane of the section being indicated by the line 1—1 on Fig. 2;

Fig. 2 is a vertical transverse section through the machine shown in Fig. 1, the plane of the section being indicated by the line 2—2 on Fig. 1;

Figs. 3 to 8 inclusive are diagrammatic views illustrating the operation of the machine according to my new process when the upper compartment of the hopper is always maintained substantially full of the molding mixture during operation; and Figs. 9 to 15 inclusive are diagrammatic views illustrating the operation of the machine according to my new process when the upper compartment of the hopper is only partially filled with molding mixture during operation.

Referring now to the drawings by reference characters the numerals 1 and 2 indicate a pair of spaced vertical side frames which are rigidly connected together at the bottoms thereof by a pair of transverse connecting base members 3.

A pattern holder generally indicated by the numeral 4, is mounted for rotation about a horizontal axis between the side frames 1 and 2 adjacent the upper edges thereof. The pattern holder 4 comprises a rectangular frame 5 to which is secured a pair of oppositely extending axially aligned stub shafts 6 and 7. The stub shafts 6 and 7 are rotatably mounted in suitable bearing apertures 8 and 9 in the frames 1 and 2, and the stub shaft 6 has a bevel gear 10 keyed to the outer end thereof. The gear 10 meshes with a bevel pinion gear 11 which is secured to the rear end of a shaft 12 which is rotatably mounted in suitable bearing brackets 13 and 14 which are secured to the outer face of the side frame 1. The forward end of the shaft 12 has a hand wheel 15 secured thereto by which the shaft 12 is adapted to be manually rotated in either direction. The rotation of the shaft 12 in first one direction and then the reverse direction will through the gears 11 and 10 rotate the pattern holder 4 back and forth between upright and inverted positions. Clamping means 16 is provided on the bearing bracket 14 to lock the shaft 12 against rotation and thereby hold the pattern holder 4 in any desired position.

A metal pattern 17 is removably secured in the pattern holder 4 upon an inturned flange 18 around the lower edge of the frame 5 by any suitable means (not shown).

A hopper generally indicated by the numeral 19, which is open at the lower end thereof and comprises the rectangular side walls 20 and the top wall 21, is adapted to be removably secured to the pattern holder 4 with the open end thereof surrounding the pattern 17 in the pattern holder 4 by bolts 22 or any other suitable means. The hopper 19 is divided into upper and lower compartments 23 and 24 respectively by a set of louvers 25 which are secured to shafts 26 rotatably supported by and between the front and back walls of the hopper. One end of each of the shafts 26 has a crank arm 27 secured thereto. The crank arms 27 are all secured to a link 28 which is adapted to be manually moved back and forth to open and close the louvers as desired. Suitable means (not shown) may be provided to lock the louvers in open and closed positions. The top wall 21 of the hopper 19 has an opening 29 therein through which the molding mixture 30 is supplied to the upper compartment 23 as needed. The opening 29 is closed by a suitable door 31. In operation the pattern holder 4, the pattern 17 and the hopper 19 are adapted to be rotated back and forth as desired between the upper position shown in dot and dash at A in Fig. 1, and the lower dot and dash position shown in Fig. 1 at B. Suitable limiting stops 32 and 33 limit the movement of the pattern holder and hopper between upper and lower dot and dash positions A and B.

The operation of the apparatus when the upper compartment 23 of the hopper 19 is always maintained substantially full of molding mixture during operation, will now be described in connection with Figs. 3 to 8 of the drawings. In Fig. 3 the pattern holder 4 and the hopper 19 are shown in vertical upright position with the upper compartment 23 of the hopper substantially full of the molding mixture 30, and a preheated pattern 17 mounted in the pattern holder 4. The louvers 25 are first opened which drops the molding mixture 30 down into the lower compartment 24 where it is evenly distributed over the preheated pattern 17 as shown in Fig. 4. After a predetermined length of time, during which time the contacting portion of the molding mixture 30 with the pattern 17 bonds and solidifies into a partially cured mold shell 34 over the face of the pattern, the pattern holder and hopper are rotated counterclockwise from the position shown in Fig. 4 through the positions shown in Figs. 5 and 6 to the position shown in Fig. 7 to return the unbonded molding mixture back to the upper compartment 23. Fig. 5 shows the distribution of the molding mixture 30 in the hopper 19 when the holder and hopper are in midpositions between vertical upright position and vertical inverted positions; and Fig. 6 shows the distribution of the molding mixture in the hopper when the holder and hopper are in vertical inverted position. When the holder and hopper are in vertical inverted position the molding mixture is very unevenly distributed with the portion thereof at the leading end of the hopper being disposed in both the upper and lower compartments 23 and 24, as shown in Fig. 6. This interferes with and may even prevent closing of the louvers to trap the molding mixture in the upper compartment 23 preparatory to returning the holder and hopper to initial upright position. Even if the louvers 25 could be closed with the holder and hopper in Fig. 6 position a portion of the molding mixture would remain in the lower compartment 24 and would either be lost or would bond unevenly with the mold shell 34 when the holder and hopper are returned to initial vertical upright position for the next operation. In order to return all of the unbonded molding mixture to the upper compartment and to distribute it to a substantially uniform depth therein so that the louvers 25 may be closed the rotation of the holder and hopper from initial vertical upright position is continued on beyond the vertical inverted position shown in Fig. 6 to the inclined position shown in Fig. 7. As the holder and hopper move from the position shown in Fig. 6 to the position shown in Fig. 7 the molding mixture flows toward the trailing end of the hopper and redistributes to a substantially uniform depth in the compartment 23 as shown in Fig. 7. After the holder and hopper reach the inclined Fig. 7 position the rotation thereof is stopped and the louvers 25 closed as shown in Fig. 8. The holder and hopper are then rotated clockwise back to the initial upright position shown in Fig. 3. The hopper 19 is then removed from the pattern holder 4 and the mold shell 34 stripped from the pattern 17. The pattern 17 is then reheated to the desired temperature after which the hopper 19 is again secured in place on the pattern holder 4 over and around the pattern 17 mounted thereon. The operation just described is repeated for each mold shell formed.

The operation of the apparatus, when the upper compartment 23 is maintained only partially full of molding mixture during operation, will now be described in connection with Figs. 9 to 15 of the drawings. Fig. 9 shows the initial vertical upright position of the pattern holder 4 and hopper 19 with the upper compartment 23 of the hopper partially full of molding mixture 30, which is evenly distributed to a substantially uniform depth therein upon the closed louvers 25, and a preheated pattern 17 mounted in the pattern holder. The louvers 25 are first opened which drops the molding mixture 30 down into the lower compartment where it is evenly distributed over the preheated pattern 17 as shown in Fig. 10. After the prescribed time, during which time the contacting portion of the molding mixture 30 with the pattern 17 bonds and solidifies ino the partially cured mold shell 34 over the face of the pattern, the pattern holder 4 and hopper 19 are rotated in unison counterclockwise from the position shown in Fig. 9 to the vertical inverted position shown in Figs. 12 and 13, then clockwise back past vertical upright position as shown in Fig. 14 to the inclined position shown in Fig. 15 and them counterclockwise from the inclined position of Fig. 15 back to initial vertical upright position as shown in Fig. 9, in order to return the unbonded portion of the molding mixture to the upper compartment 23 and to evenly distribute it to a substantially uniform depth therein upon the louvers 23. The various figures (Figs. 9 to 15) illustrate the flow of the molding mixture 30 back and forth between the compartments 23 and 24 during the aforesaid rotation of the holder 4 and hopper 19. Fig. 11 shows the distribution of the molding mixture in the hopper 19 when the holder and hopper are in midposition between vertical upright position and vertical inverted position, and Fig. 12 shows the distribution of the molding mixture when the holder and hopper are stopped in inverted position. Before returning the holder and hopper to upright position the louvers 25 are closed as shown in Fig. 13 to trap the molding mixture in the upper compartment 23. The distribution of the molding mixture in the upper compartment 23 when the holder and hopper reach vertical upright position during the return movement from inverted position is shown in Fig. 14. As shown therein the molding mixture is unevenly distributed upon the louvers 25 the depth thereof being greater at the trailing end of the hopper. As the holder and hopper are rotated clockwise on past vertical upright position as shown in Fig. 14 to the inclined position shown in Fig. 15 the molding mixture flows toward the leading end of the hopper and redistributes to a substantially uniform depth over the louvers 25 as shown in Fig. 15. The holder and hopper are then returned to the initial vertical upright position as shown in Fig. 9, when the hopper 19 is removed from the pattern holder 4 and the mold shell 34 stripped from the pattern 17. After the pattern 17 has been reheated to the desired temperature the holder 19 is again secured in place upon the holder 4 over and around the pattern 17 mounted thereon. The operation described is repeated for each mold shell formed.

From the foregoing it will be apparent to those skilled in this art that I have provided a very simple and efficient process and apparatus for accomplishing the objects of the invention.

It is to be understood that I am not limited to the specific construction shown and described herein, or to the specific order of the various process operations described, as various modifications may be made therein within the scope of the appended claims. For instance power-actuated means, such as is shown in the aforesaid co-pending applications, for bringing the pattern holder and hopper into juxtaposition, for rotating the holder and hopper back and forth between upright and inverted positions and for actuating the louvers, may be substituted for the manually actuated means shown and described herein. Also the louvers 25 can be operated in a different sequence than that described. If desired the louvers could be opened to drop the molding mixture down onto the pattern and then immediately closed again before the holder and hopper are inverted and then opened and closed again when the holder and hopper are in inverted position before returning them to upright position. Also any other suitable gate means, either rotary or slidable, may be substituted for the louvers 25 in the hopper 19.

The process of rotating the pattern holder and hopper in unison on past vertical inverted position to a lower inclined position and/or past vertical upright position to effect the even distribution of the molding mixture over the pattern can be carried out in an apparatus wherein the hopper is permanently mounted for rotation between upright and inverted position and the pattern holder with a preheated pattern mounted thereon is manually secured to and removed from the open end of the hopper when the hopper is at rest in inverted position. In these machines the louvers which divide the hopper into upper and lower compartments are dispensed with and the molding mixture is distributed directly over the pattern as the hopper is brought to upright position. In operation the molding mixture is placed in the hopper while the hopper is at rest in inverted position with the open end thereof uppermost. The pattern holder with a preheated pattern mounted thereon is then manually secured to the open end of the hopper with the pattern facing downwardly into the hopper. The hopper is then rotated from inverted position up past vertical upright position to an inclined position and then returned to vertical upright position to distribute the molding mixture to a substantially uniform depth over the face of the pattern and is maintained stationary in upright position until the molding mixture bonds and solidifies to the desired thickness after which the hopper is returned to inverted position, in which position the unbonded excess molding mixture falls down into the hopper leaving the formed mold shell adhering to the pattern. The pattern holder and pattern with the partially cured mold shell thereon are then manually removed from the hopper and the mold shell stripped from the pattern. The pattern is then reheated to the desired temperature after which the pattern holder and pattern are again secured in place over the open end of the hopper. The process is then repeated for each mold shell formed.

What is claimed is:

1. Apparatus for making a shell mold, comprising a pattern, a hopper for a molding mixture closed at one end and having a discharge opening at the other end, closure means in said hopper forming with said closed end a closed hopper compartment, means mounting said hopper and said pattern for relative movement, to bring the hopper and pattern into sealing engagement with the discharge opening surrounding said pattern, a supporting frame, means rotatably mounting said hopper and pattern on said frame for rotation in unison about a horizontal axis from vertical upright position to vertical inverted position and return, said closure means being adapted to be opened when said unit is in vertical upright position to drop the molding mixture onto said pattern and to be closed when said unit is in vertical inverted position to confine the loose molding mixture in said compartment, and a stop member mounted on said frame in position to engage said unit to limit the rotational movement of said unit in at least one direction when it reaches a predetermined inclined position after passing through the vertical position, said predetermined inclined position being selected to cause the molding mixture in said compartment to level itself by gravity.

2. Apparatus for making a shell mold, comprising a pattern, a hopper for a molding mixture closed at one end and having a discharge opening at the other end, closure means in said hopper forming with said closed end a closed hopper compartment, means mounting said hopper and said pattern for relative movement to bring the hopper and pattern into sealing engagement with the discharge opening surrounding said pattern, a supporting frame, means rotatably mounting said hopper and pattern on said frame for rotation in unison about a horizontal axis from vertical upright position to vertical inverted position and return, said closure means being adapted to be opened when said unit is in vertical upright position to drop the molding mixture onto said pattern and to be closed when said unit is in vertical inverted position to confine the loose molding mixture in said compartment, and a stop means member mounted on said frame in a position to engage said unit to limit the rotational movement of said unit when in a predetermined inclined position after passing through vertical upright position in its return movement, said predetermined inclined position being selected to cause the molding mixture in said compartment to level itself by gravity.

References Cited in the file of this patent

UNITED STATES PATENTS

| | | |
|---|---|---|
| 2,630,608 | Granath | Mar. 10, 1953 |
| 2,659,945 | Valyi | Nov. 24, 1953 |

FOREIGN PATENTS

| | | |
|---|---|---|
| 832,936 | Germany | Mar. 3, 1952 |

OTHER REFERENCES

Foundry, September 1952, pp. 95–97, 108–111.
The Iron Age, April 19, 1951, pp. 81–85.
Fortune, July 1952, pp. 104–107.